(12) United States Patent
Harding

(10) Patent No.: US 10,314,289 B1
(45) Date of Patent: Jun. 11, 2019

(54) GRAVITY-OPERATED WILDLIFE FEEDER WITH REALISTIC TREE STUMP APPEARANCE

(71) Applicant: Duane Harding, Stillwater, OK (US)

(72) Inventor: Duane Harding, Stillwater, OK (US)

(73) Assignee: Wombat Labs, LLC, Stillwater, OK (US)

( * ) Notice: Subject to any disclaimer, the term of this patent is extended or adjusted under 35 U.S.C. 154(b) by 175 days.

(21) Appl. No.: 15/347,981

(22) Filed: Nov. 10, 2016

Related U.S. Application Data

(60) Provisional application No. 62/253,584, filed on Nov. 10, 2015.

(51) Int. Cl.
*A01K 5/02* (2006.01)

(52) U.S. Cl.
CPC .................................. *A01K 5/0225* (2013.01)

(58) Field of Classification Search
CPC ....... A01K 5/0225; A01K 5/02; A01K 5/0114
See application file for complete search history.

(56) References Cited

U.S. PATENT DOCUMENTS

| | | | | |
|---|---|---|---|---|
| 1,642,944 A | * | 9/1927 | Dannenberg | A01K 5/0225 119/53.5 |
| 5,699,753 A | * | 12/1997 | Aldridge, III | A01K 5/0225 119/52.1 |
| 5,819,687 A | * | 10/1998 | Lister | A01K 5/01 119/52.1 |
| 7,373,901 B2 | * | 5/2008 | Baynard | A01K 39/012 119/52.3 |
| 8,272,350 B1 | * | 9/2012 | England | A01K 5/025 119/52.1 |
| 2006/0225658 A1 | * | 10/2006 | Baynard | A01K 39/012 119/57.8 |
| 2013/0133582 A1 | * | 5/2013 | Cheng | A01K 39/012 119/52.2 |

OTHER PUBLICATIONS

Redneck Blinds; T-Post Gravity Feeder; https://redneckblinds.com/store/t-post-feeder; printed Nov. 9, 2016.

* cited by examiner

*Primary Examiner* — Kristen C Hayes
(74) *Attorney, Agent, or Firm* — Gable Gotwals

(57) ABSTRACT

A gravity-operated wildlife feeder with realistic tree stump appearance is disclosed. The body and its feed delivery compartments or chutes are molded from a composite material as a single piece to reduce cost and improve durability. The shape of the delivery chutes makes it so there are no pockets or other areas where feed can collect and not be discharged from the feed openings. The feed openings are located at the ends of root-shaped protrusions.

19 Claims, 6 Drawing Sheets

US 10,314,289 B1

GRAVITY-OPERATED WILDLIFE FEEDER WITH REALISTIC TREE STUMP APPEARANCE

CROSS-REFERENCE TO CO-PENDING APPLICATIONS

This application claims priority to U.S. Pat. App. Ser. No. 62/253,584 filed Nov. 10, 2015.

BACKGROUND OF THE INVENTION

This invention relates to feeders used to attract wildlife.

When trying to attract wildlife by using a feeder, animals are often fearful of mechanical feeders. The sounds and appearance of the feeder can make the animals cautious and prevent them from approaching the area during daylight hours.

Prior art designs require multiple parts to create the feeder and its gravity delivery mechanism, leading to higher manufacturing costs. Because of the arrangement between the delivery mechanism and the feed openings, pockets or other areas are created that do not allow the feeder's storage body to fully empty. Some of the designs have a very distinct, unnatural appearance that can deter the animals the feed is intended to attract. More realistic appearing designs use materials that are not durable, especially when exposed to the elements, and are susceptible to damage from rodents or other animals.

SUMMARY OF THE INVENTION

In a preferred embodiment of a gravity-operated wildlife feeder, the feeder includes a cylindrical-shaped body that has a feed opening located toward a lower end of the body and at least two gravity operated delivery mechanisms (compartments or chutes) located in an interior space of the body above the lower end and sharing a common space with one another above the chutes.

The body and its lid has an outer surface that simulates a tree bark-like texture (at least in appearance) and color. The body, delivery chute, and feeder opening should be a single-piece, making the bottom of the delivery chutes the bottom of the wildlife feeder. Preferably, the feeder is formed using rotational molding and made of a polyethylene composite material or its equivalent. The feeder may rest on the ground or support extensions (not shown) with integrated feed trays could be added to elevate the feeder to avoid moisture wicking from the ground and into the feed, and to make it easier for deer to access the feed.

Because of the shape used for the delivery chutes, all of the feed stored in the body gets directed toward the feed openings and minimal amounts of feed collect in places where it cannot be discharged through the openings. Because no moving parts are used in the delivery chutes, manufacturing cost is reduced and durability is improved.

To improve the natural look and feel of the feeder, the feed openings located at the ends of "root protrusions" formed as part of the body. The openings may be oriented vertically or, in the case where support extensions are used, horizontally. Protective covers, preferably metallic, may be secured over the edges of the feed openings to prevent ingress to the feeder's interior by rodents or damage from rodents.

ELEMENTS AND NUMBERING USED IN THE DRAWINGS AND DETAILED DESCRIPTION

Figure 1:
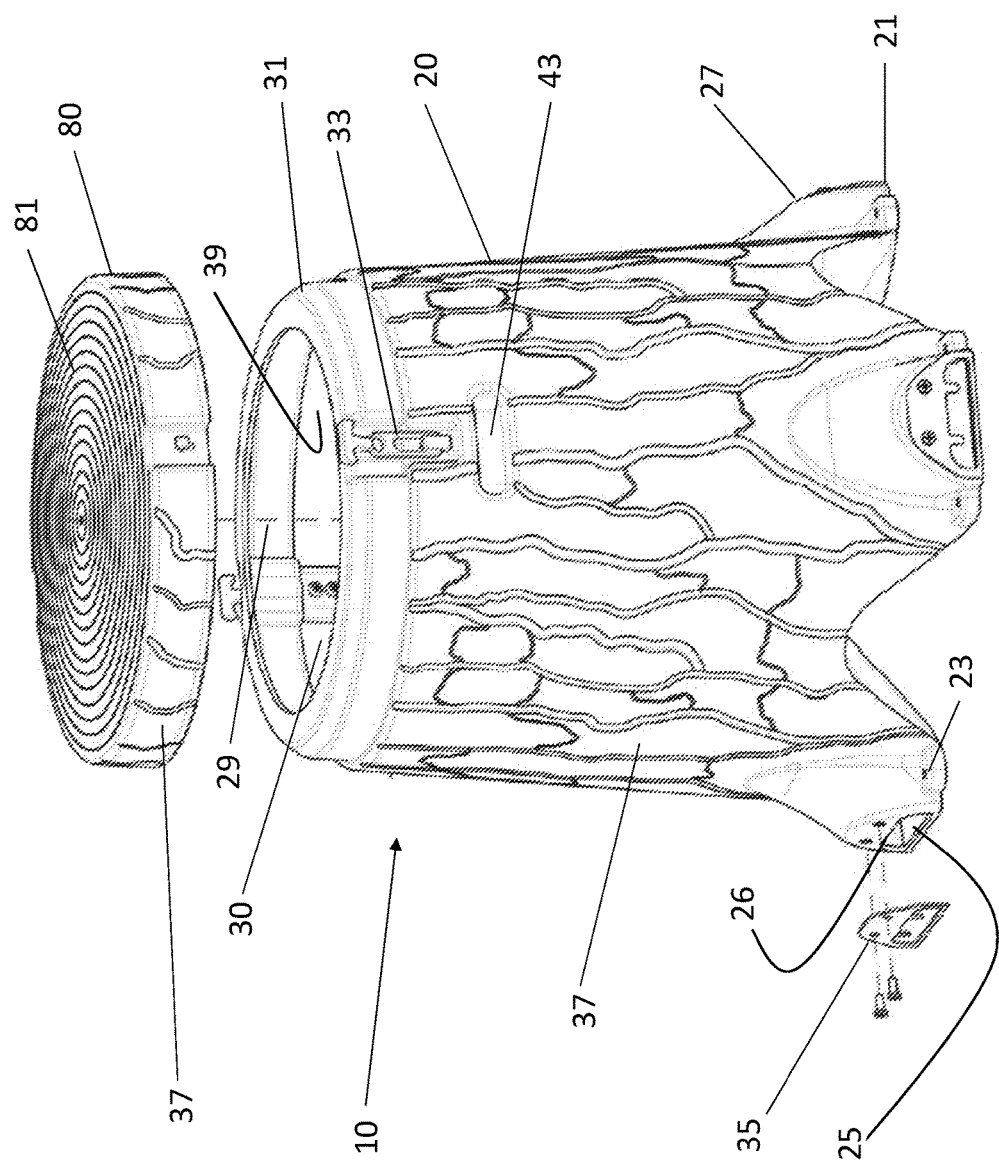
FIG. 1 is an isometric view of a preferred embodiment of the gravity-operated wildlife feeder with its lid removed from the body.
Figure 3:
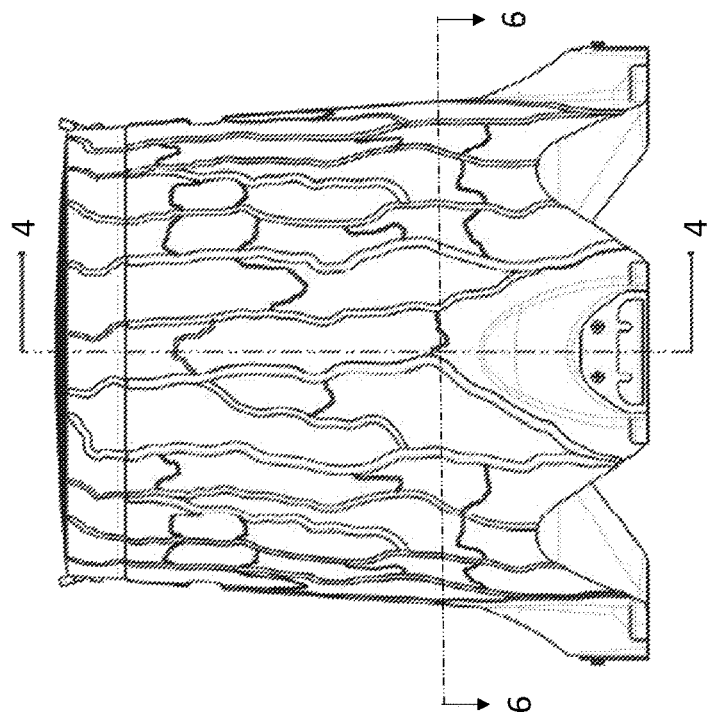
FIG. 3 is a front elevation view of the feeder of FIG. 1.
Figure 2:
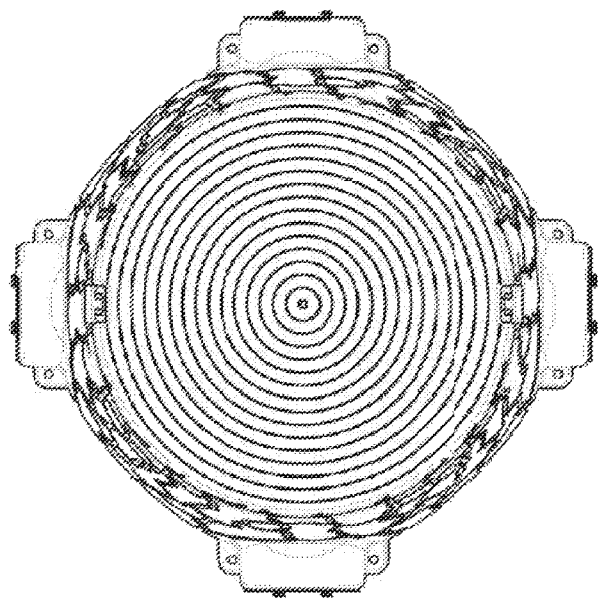
FIG. 2 is a top view of the feeder of FIG. 1.
Figure 5:
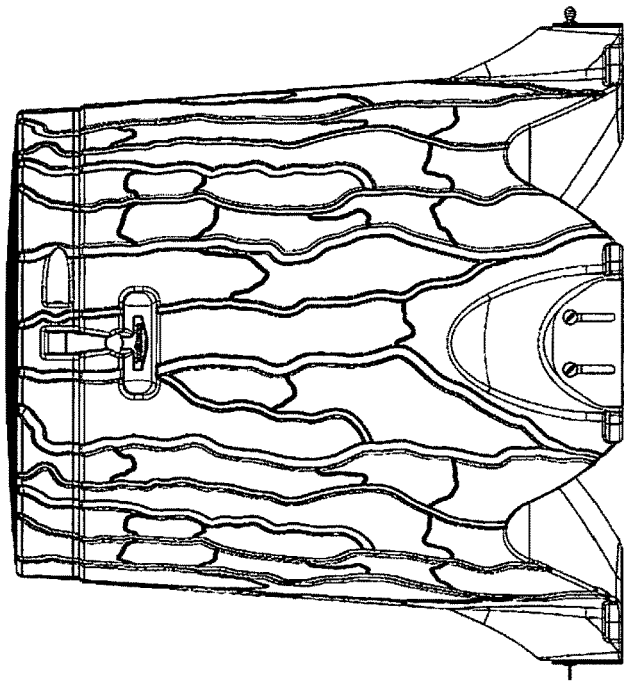
FIG. 5 is a CAD-generated model of the feeder.
Figure 4:
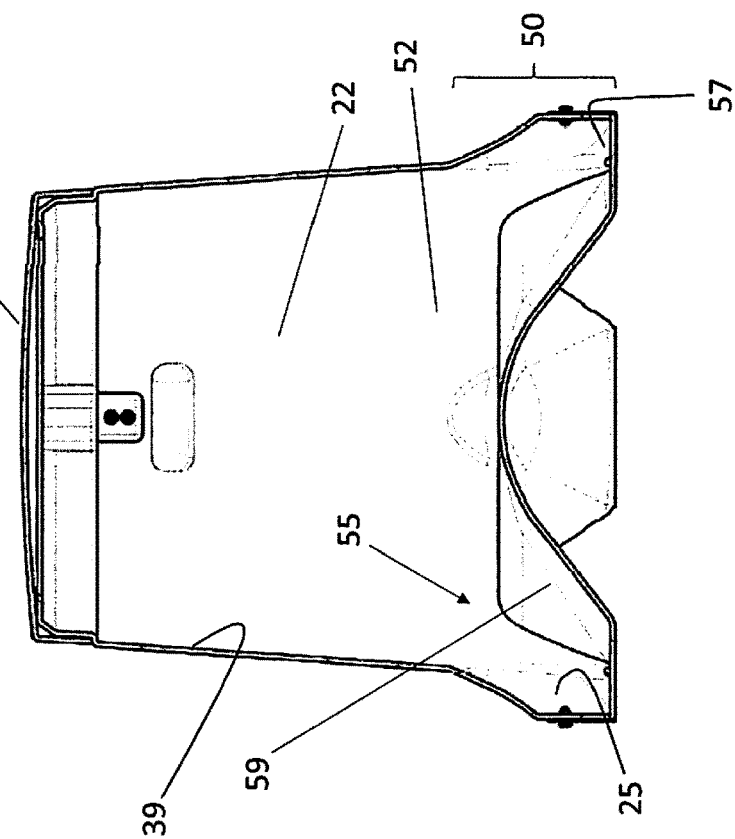
FIG. 4 is a cross-section view of the feeder of FIG. 1 taken along section line 4-4 of FIG. 3.
Figure 6:
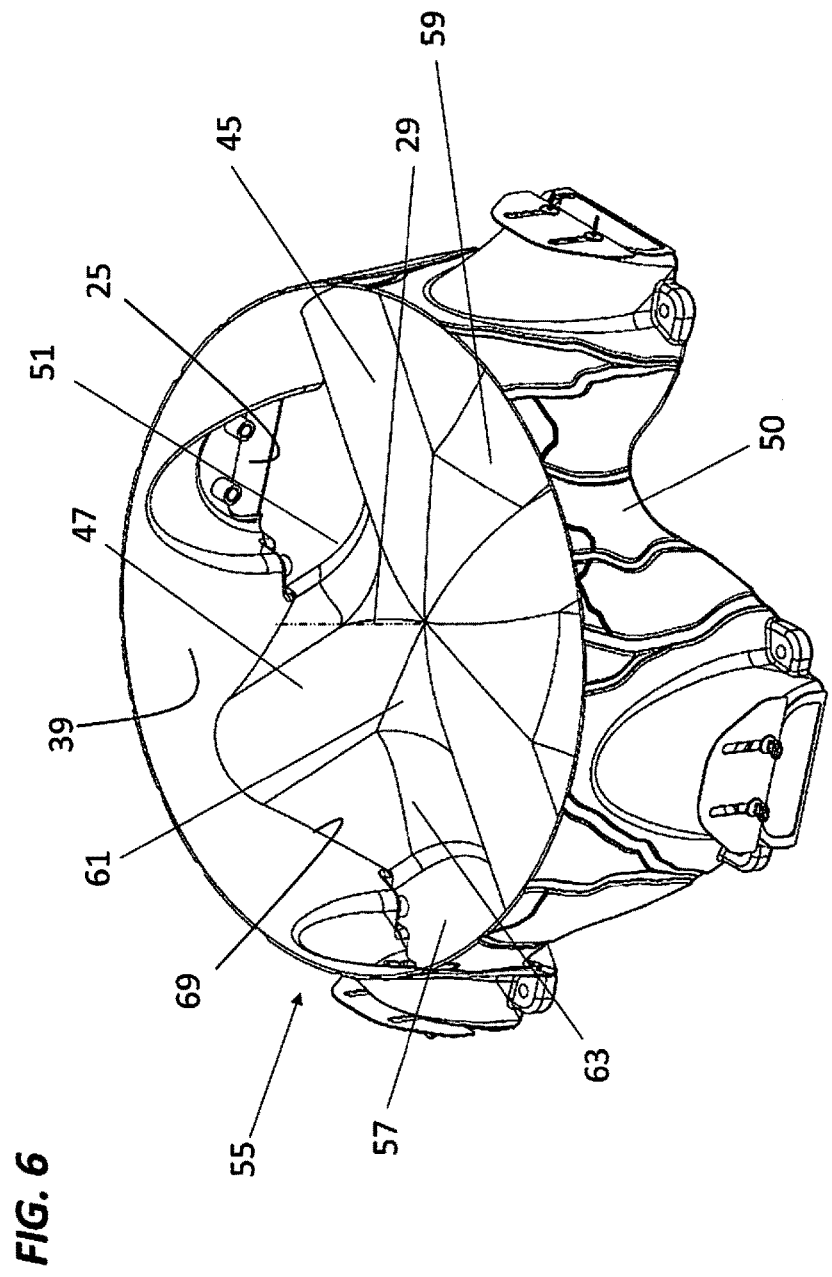
FIG. 6 is a view taken along section line 6-6 of FIG. 3.
Figure 7:
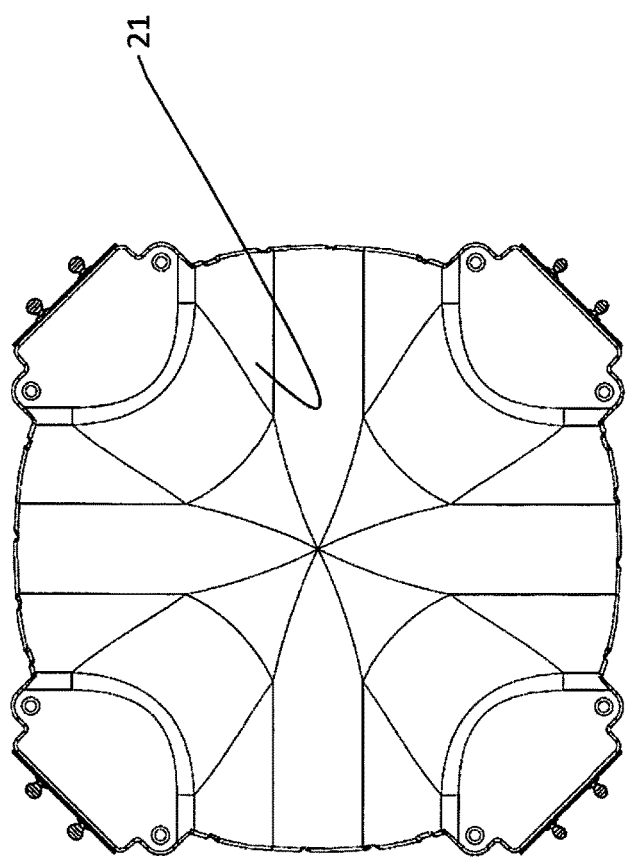
FIG. 7 is a bottom view of a CAD-generated solid model of the feeder.
Figure 8:
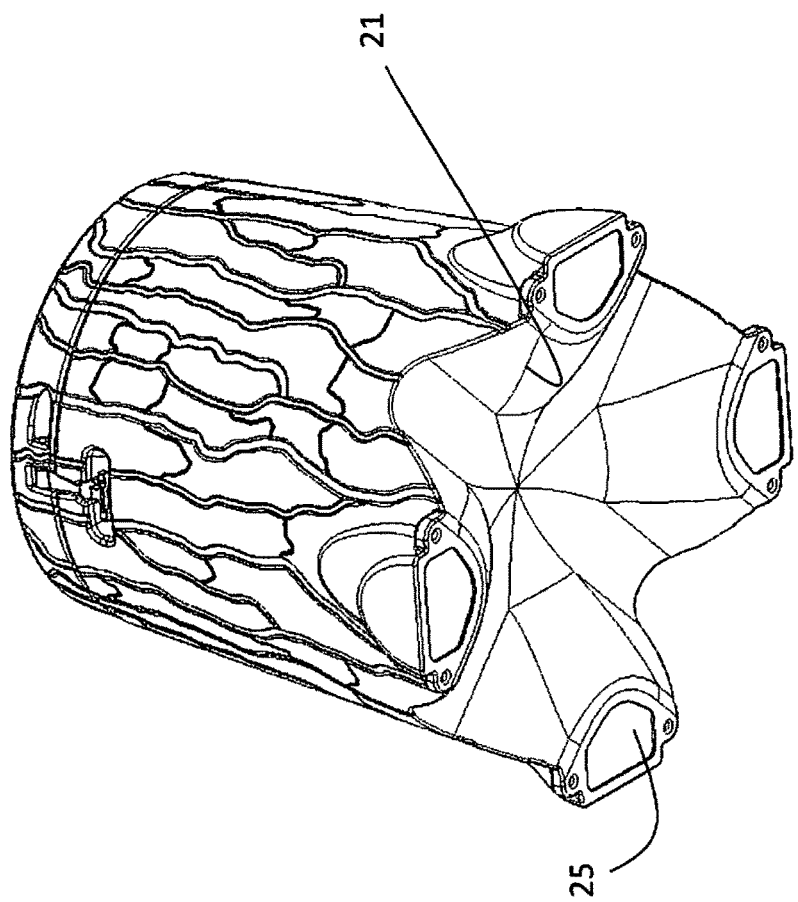
FIG. 8 is an isometric view of a CAD-generated solid model of a preferred embodiment that includes feeder openings located on the bottom of each root protrusion or leg.

10 Feeder
20 Body
22 Interior space
21 Lowermost or bottom end
23 Anchor point
25 Feed opening
26 Edges of feed opening
27 Root protrusion
29 Central longitudinal axis
30 Central opening of body
31 Uppermost or top end
33 Latch-and-strap arrangement
35 Protective plate
37 Outer wall surface
39 Inner wall surface
43 Carrying handle
45 Cross-member
47 Upper end of cross-member
50 Base portion
51 Lowermost or bottom end of slide or chute
52 Common space
55 Delivery compartment or chute
57 Flat bottom surface
59 Slide
61 First curved and downward sloping surface
63 Second curved and downward sloping surface
69 Sides of slide
71 Uppermost or top end of slide or chute
80 Lid
81 Upper face surface of lid

DETAILED DESCRIPTION OF THE PREFERRED EMBODIMENTS

Referring to the drawing figures, a preferred embodiment of a gravity-operated wildlife feeder 10 includes a molded, tree-stump-shaped body 20 that can store wildlife feed or attractant; at least two delivery compartments or chutes 55 that form the base portion 50 of the body 20 and direct feed to a respective feed opening 25; a molded lid 80 sized to cover the body's central opening 30 in a removable snap-, press-fit, or twist-lock manner; and one or more removable (optional) protective plates 35 to cover the peripheral edges 26 of the feed openings 25.

Preferably the body 20 and lid 80 are made of a polyethylene composite material (or its equivalent) and formed using rotational molding. The inner surfaces of the rotational mold components for the body 20 and lid 80 have a reverse geometry and texture similar to that found on a tree or tree stump. Therefore, the outer surfaces 37 appear similar to that of a tree stump, with the upper face surface 81 of the lid 80 simulating growth rings. The composite material should not be a single color, but rather a blend of numerous colors, including but not limited to black, gray, green, white and brown, in order to simulate the various natural colors found in tree bark. A latch-and-strap arrangement 33 or its equivalent may be used to further secure the lid 80 to the body's central opening 30.

The protective plates 35 may be made from sheet metal forming, machining, casting, or forging and secured to the body 20 using screws received by molded-in threaded inserts. In an alternate embodiment a metallic plate 35 could be molded into the body 20 (encased in the composite material).

The body 20 may include integrated geometry located toward its uppermost end 29 that provides a set of carrying handles 43. Anchor points 23 may be included at the lowermost end 21 of the body 20 and arranged to receive stakes, spikes, or tethers (not shown) to anchor the feeder 10 to the ground or other surroundings. Similar anchor points 23, which may be molded as part of the body 20, could be added one or more support extensions (not shown) which may be used to raise the feeder 10 above ground level.

The base portion 50 of the body 20 provides a unique shape that directs the feed or attractant toward each of the feed openings 25 and minimizes the amount of feed collecting in places where it cannot be discharged through the openings 25. This base portion 50 forms the body's bottom end 21 which, when viewed from the bottom, is flat toward the feed openings 25 but otherwise curving inward and away from those flats. These curving surfaces are the feed delivery compartments or chutes 55 located inside the body 20. These chutes 55 are formed by a cross-member 45 located at an uppermost end 71 of the chute 55, a slide 59 with at least one curved and downward sloping face 61, 63, and, at the lowermost end 51 of the slide 59, a flat bottom 57 that extends to a respective feed opening 25.

Cross-member 45 is arranged coaxial to the central longitudinal axis 29 of the body 20. In a preferred embodiment, cross-member 45 is X-shaped, defining four separate feed delivery compartments or chutes 45 that correspond to one of the feed openings 25. In another embodiment, cross-member 45 is Y-shaped, defining three delivery chutes 55. In yet another embodiment, cross-member 45 is I-shaped, defining two delivery chutes 55. Other cross-member shapes may be used, depending on the number of chutes 55 desired and whether equal-sized chutes 55 are desired.

A divider panel (not shown) may be added above the cross-member 45 to allow multiple type of feed to be used. Regardless of whether a divider panel is used or the number of chutes 45 defined, the chutes 55 share a common space 52 with one another above the cross-member 45, with each chute 55 exposed along its entire length to the opening 30. Feed or attractant being dumped into the body 20 through the opening 30 can fall directly onto any portion of the chute 55.

The upper end 47 of cross-member 45 should be rounded so feed rolls toward the chutes 55 and does not collect on the cross-member 45. This rounded upper end 47 may narrow toward the body's central longitudinal axis 29 to form, with an adjacent rounded upper end 47, a first curved and downward sloping surface 61 of a slide 59. This first curved and downward sloping surface 61 merges into a second curved and downward sloping surface 63 of the slide. The surfaces 61, 63 may have a same downward slope or a different downward slope toward the feed opening 25.

The width of the slide 59—and therefore the width of delivery compartment or chute 55—narrows toward the feed opening 25. The sides 69 of the slide 59 connect to the inner wall surfaces 39 of the body 20 lying directly opposite the sides 69. At the lowermost end 51 of the slide 59 is a flat bottom surface 57 that terminates at the feed opening 25. When viewed from the top, the lowermost end 51 of the slide 59 may form an arcuate-shape where its meet the flat bottom surface 57. In another embodiment, the bottom surface may slope downward or form a curved surface (or both).

The feed opening 25 preferably lies at the end of a "root protrusion" 27 formed as part of the body 20. This arrangement places the opening 25 at a greater distance from the central longitudinal axis 29 of the body 20 than the outer wall surfaces 37 of the body 20 that lie adjacent to the opening 25. In one embodiment, the feed opening 25 lies in a vertical plane. In another embodiment, the feed opening 25 lies in a horizontal plane, with one or more support elements used to raise the feeder 10 above ground level. Preferably, no portion of the respective feed opening 25 is located below the lowermost end 21 of the body 20. A protective plate 35 sized to cover the peripheral edges 26 of the feed opening 25 may be included.

When in use, the feeder 10 is placed in a desired location. The lid 80 is removed and wildlife feed—in grain, pelletized or otherwise granulized form—is poured into the body's interior space 22 to the desired level. Some of the feed will spill out of the feed openings 25 and onto the ground. As wildlife consumes the feed on the ground, more feed will spill from the openings 25 until the body 20 is empty. A wildlife feeder made according to this invention is defined by the claims that follow below. Those claims cover the full range of designs to which the recited elements are entitled by way of equivalents. Because the feeder uses only the force of gravity to deliver the feed, and because the feeder has a natural appearance, it is less threatening to the wildlife it is intended to attract. The feeder may be used to feed domesticated livestock or pets, and can be used as a storage vessel for common gardening-related items, such as irrigation hoses or other tools.

What is claimed:

1. A wildlife feeder comprising:
   a cylindrical-shaped body including at least two feed openings located toward a lower end of the body and a central opening located at an uppermost end of the body; and
   at least two feed delivery compartments located within in an interior space of the body above the lower end, each feed delivery compartment corresponding to a respective feed opening of the at least two feed openings;
   each delivery compartment including a curved surface sloping downwardly toward the respective feed opening, the curved surface being exposed along its entire length to, and facing opposite of, the central opening of the body, a width of each delivery compartment narrowing toward the respective feed opening.

2. A wildlife feeder according to claim 1 further comprising each delivery compartment including a flat bottom surface located between a bottom end of the curved surface and the respective feed opening.

3. A wildlife feeder according to claim 1 further comprising a rounded uppermost end of each delivery compartment.

4. A wildlife feeder according to claim 1 further comprising each delivery compartment including at least one other curved surface sloping downwardly toward the respective feed opening, the at least one other curved surface having a different downward slope than the curved surface.

5. A wildlife feeder according to claim 1 further comprising a bottom of each of delivery compartments being a bottom of the wildlife feeder.

6. A wildlife feeder according to claim 1 further comprising the respective feed opening lying a greater distance from a central longitudinal axis of the body than an outer wall surface of the body lying adjacent to the respective feed opening.

7. A wildlife feeder according to claim 1 wherein no portion of the respective feed opening is located below a lowermost end of the body.

8. A wildlife feeder according to claim 1 further comprising the respective feed opening being oriented in a vertical plane.

9. A wildlife feeder according to claim 1 further comprising the respective feed opening being oriented in a horizontal plane.

10. A wildlife feeder according to claim 1 further comprising the body including an outer wall surface having a tree bark pattern.

11. A wildlife feeder according to claim 10 further comprising the outer wall surface including at least two colors.

12. A wildlife feeder according to claim 1 further comprising a protective plate sized to cover peripheral edges of the respective feed opening.

13. A wildlife feeder according to claim 12 wherein the protective plate is a removable protective plate.

14. A wildlife feeder according to claim 1 further comprising a removable lid located at an uppermost end of the body.

15. A wildlife feeder according to claim 14 further comprising a latch-and-snap arranged to secure the removable lid to the uppermost end of the body.

16. A wildlife feeder according to claim 14 further comprising the removable lid including an outer wall surface having a tree bark pattern and at least two colors.

17. A wildlife feeder comprising:
a cylindrical-shaped body including an outer wall surface having a tree bark pattern, at least two feed openings located toward a lower end of the body but not extending below a lowermost end of the body, and a central opening located at an uppermost end of the body;
a lid sized to cover the central opening and including an outer wall surface the tree bark pattern;
at least two feed delivery compartments located within in an interior space of the body above the lower end, a bottom end of the feed delivery compartments being the lowermost end of the body, each feed delivery compartment corresponding to a respective feed opening of the at least two feed openings;
each delivery compartment including a rounded uppermost end and a curved surface sloping downwardly toward the respective feed opening, the curved surface being exposed along its entire length to, and facing opposite of, the central opening of the body, a width of each delivery compartment narrowing toward the respective feed opening.

18. A wildlife feeder according to claim 17 further comprising each delivery compartment including a flat bottom surface located between a bottom end of the curved surface and the respective feed opening.

19. A wildlife feeder comprising:
a cylindrical-shaped body including an outer wall surface having a tree bark pattern, and a central opening located at an uppermost end of the body;
a lid sized to cover the central opening and including an outer wall surface having the tree bark pattern;
at least two feed delivery compartments located within in an interior space of the body above the lower end, a bottom end of the feed delivery compartments being the lowermost end of the body, each feed delivery compartment corresponding to a respective feed opening of the at least two feed openings;
each delivery compartment including a rounded uppermost end, a curved surface sloping downwardly toward the respective feed opening, the curved surface being exposed along its entire length to, and facing opposite of, the central opening of the body, and a flat bottom surface extending between a lowermost end of the curved surface and the respective feed opening, a width of each delivery compartment narrowing toward the respective feed opening.

\* \* \* \* \*